United States Patent [19]

Komatsu et al.

[11] Patent Number: 4,844,946

[45] Date of Patent: Jul. 4, 1989

[54] METHOD FOR PREPARING A MAGNETIC RECORDING MEDIUM

[75] Inventors: Kazunori Komatsu; Hiroshi Chikamasa; Tsunehiko Sato, all of Kanagawa, Japan

[73] Assignee: Fuji Photo Film Co., Ltd., Kanagawa, Japan

[21] Appl. No.: 25,550

[22] Filed: Mar. 13, 1987

[30] Foreign Application Priority Data

Mar. 13, 1986 [JP] Japan .................................. 61-53568

[51] Int. Cl.$^4$ ............................................. H01F 10/02
[52] U.S. Cl. .................................... 427/48; 427/130;
427/131; 428/336; 428/694; 428/900

[58] Field of Search ................. 427/48, 131, 129, 130;
428/694, 900, 436

[56] References Cited

FOREIGN PATENT DOCUMENTS 0144705 12/1978 Japan .................................. 427/131

Primary Examiner—Bernard Pianalto
Attorney, Agent, or Firm—Sughrue, Mion, Zinn, Macpeak & Seas

[57] ABSTRACT

A method of fabricating a magnetic tape in which a non-magnetic support is simultaneously coated with two coating solutions, with the upper layer having a dried thickness no thicker than that of the lower layer. While the layers remain wet, the layers are subjected to magnetic orientation and are then dried.

3 Claims, 1 Drawing Sheet

METHOD FOR PREPARING A MAGNETIC RECORDING MEDIUM

BACKGROUND OF THE INVENTION

1. Field of the Invention

The present invention relates to a method for preparing a magnetic recording medium and more particularly it relates to a method suitable for preparing a magnetic recording medium having a thin magnetic layer of dry thickness of 2 μm or less.

2. Background of the Invention

Generally, a magnetic recording medium is prepared by coating a belt-shaped non-magnetic support with a coating solution containing a dispersion of ferromagnetic particles and a binder dissolved by a solvent while the support is continuously being run in its length-direction. The coating solution is dried and solidified and the support is slit.

However, upon preparing a magnetic tape, in order to increase sensitivity and to improve the S/N ratio, it is necessary that ferromagnetic particles be aligned in the travelling direction of a non-magnetic support, thereby increasing a squareness ratio (the ratio of the residual magnetization $B_r$ to the saturation magnetization $B_m$) of the magnetic layer. Accordingly in a conventional method, upon preparing a magnetic tape, the axis of easy magnetization of ferromagnetic particles is set in the travelling direction of a non-magnetic support by orienting ferromagnetic particles in the travelling direction with permanent magnets, a solenoid or the like while the coating solution remains undried.

Recently, the increase of large size memories and the increase of recording and reproducing performance in a magnetic recording medium such as a magnetic disk or a magnetic tape have strongly been desired.

In order to increase memory capacity, it is, needless to say, necessary to increase the recording information density per unit area of a magnetic recording medium. On the other hand, in order to increase recording information density, magnetic flux coming from a magnetic head must be concentrated to an extremely small area. For this reason, a magnetic head must be miniaturized and the quantity of magnetic flux must be decreased.

In order to reverse the direction of magnetization with such a small reduced quantity of magnetic flux, it is necessary to decrease the volume of a magnetic layer. Accordingly, satisfactory magnetization inversion cannot be carried out unless the thickness of a magnetic layer is decreased.

For the above reason, it becomes necessary to decrease the thickness of the magnetic layer.

Furthermore, in order to increase output signals for recording and reproducing, it is necessary to increase residual magnetic flux of a magnetic layer. For this purpose, the thickness of a magnetic layer must be increased, but when the thickness thereof is increased, the high frequency characteristics deteriorate. In this connection, in order to increase residual magnetic flux and to improve high frequency characteristics, it is necessary not only to decrease the thickness of the magnetic layer but also to increase the coercive force of magnetic materials. In order to meet the above requirements, it is suggested that magnetic materials having high coercive force are used to prepare a thin magnetic layer. In this case, however, high frequency characteristics are improved but low frequency characteristics are degraded. Furthermore, when the thickness of a magnetic layer prepared from magnetic materials having high coercive force is increased, a high frequency magnetic field penetrates only on the surface of the magnetic layer. Therefore, it is difficult to perform erasure.

To solve the contradictory problems as above, an ideal magnetic recording medium is produced which has a comparatively thick lower layer prepared from magnetic materials having comparatively low coercive force and high residual magnetic flux and a thin upper magnetic layer provided on top thereof prepared from magnetic materials having high coercive force. In this way, a method of coating two layers separately and conducting magnetic orientation has conventionally been conducted.

However, when two layers are provided and the dried thickness of the upper thin magnetic layer is 2 μm or less, it was found that the squareness ratio is not remarkably improved.

It is reasoned that due to such a thin upper magnetic layer of 2 μm or less, drying speed becomes so fast that the viscosity of the layer increases rapidly before the magnetic field is formed. As a result, ferromagnetic particles move with difficulty.

It is furthermore reasoned that when a second thin magnetic layer is provided on the first dried magnetic layer, solvents used in the second layer are adsorbed by the first layer, thereby increasing the viscosity of the second layer more rapidly than ever in addition to the above phenomenon. And as a result, ferromagnetic particles move with difficulty.

SUMMARY OF THE INVENTION

An object of the present invention is to provide a method for preparing a magnetic recording medium having high increased efficiencies of containing voluminous information, recording and reproducing the same and having excellent sensitivity and S/N ratio, thereby avoiding the problems of the prior art.

The invention can be summarized as a method of fabricating a magnetic tape in which a non-magnetic support is simultaneously coated with two coating solutions, with the upper layer having a dried thickness no thicker than that of the lower layer. While the layers remain wet, the layers are subjected to magnetic orientation. The two layers are then dried.

DETAILED DESCRIPTION OF THE INVENTION

Figure 1:
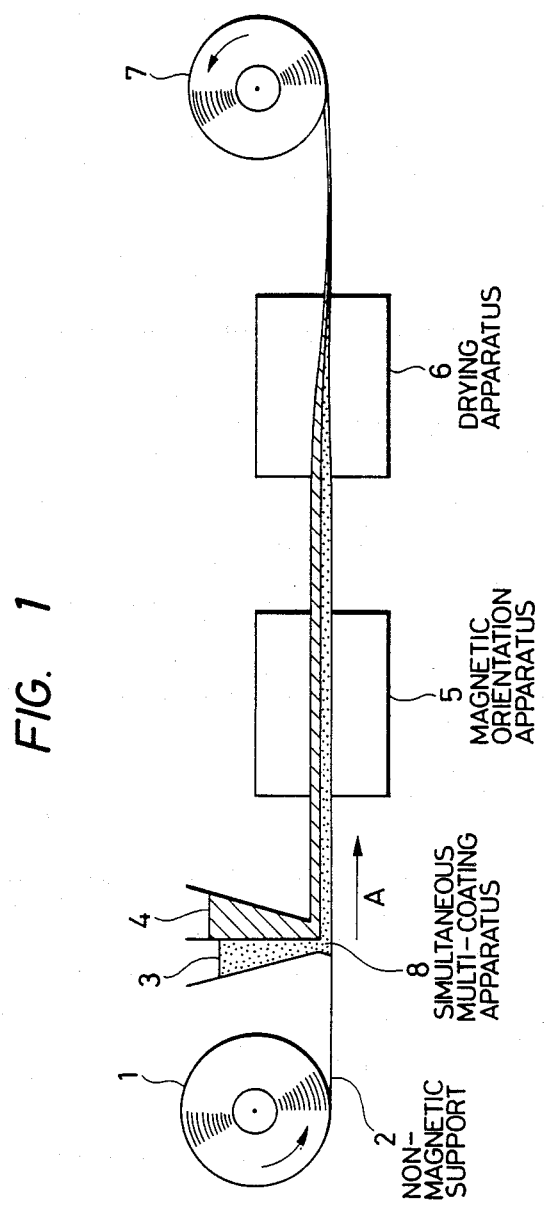
FIG. 1 shows one embodiment of the present invention showing a method for preparing a magnetic recording medium by a simultaneous multi-coating method.

As a result of various studies to solve the above problems, the inventors found that a magnetic recording medium having excellent characteristics can be prepared by a method which comprises simultaneously providing on a non-magnetic support at least two magnetic layers. The uppermost layer has a dry thickness of 2 μm or less. Then, a magnetic field is applied while these magnetic layers remain undried. Thereby the above object can be attained.

That is, the method of the present invention relates to preparing a magnetic recording medium which comprises coating a magnetic coating solution on a continuously travelling non-magnetic support to prepare a magnetic layer and applying a magnetic field to cause magnetic orientation while the magnetic layer is undried. The present invention relates to an improvement in this method which comprises multi-coating at least two magnetic layers simultaneously and conducting magnetic orientation while both of the magnetic layers are undried.

The simultaneously multi-coating method referred to in the present invention may include not only an extrusion coating method which can extrude a plural number of coating solutions at the same time but also methods of coating one layer and immediately thereafter coating another layer and so on while the supporting layers are in a wet condition, and a general method of coating a magnetic layer on the magnetic layer which is coated beforehand and remains undried.

It is preferred the uppermost magnetic layer has a dry thickness of 2 $\mu$m or less.

The non-magnetic supports used in the present invention are flexible plastic films of polyesters such as polyethylene terephthalate or polyethylene naphthalate, of polyolefines such as polypropylene, of cellulose derivatives such as cellulose triacetate or cellulose diacetate.

The ferromagnetic particles used in the magnetic layer of the present invention are $\gamma$-$Fe_2O_3$, Co-containing $\gamma$-$Fe_2O_3$, $Fe_3O_4$, Co-containing $Fe_3O_4$, $CrO_2$-Co-Ni-Fe alloy and Co-Ni-P alloy and the like. The ferromagnetic particles used in the upper layer or the under layer are not particularly limited.

These ferromagnetic particles are dispersed together with a binder and other additives in an organic solvent to prepare a magnetic coating solution and the magnetic coating solution is applied as a coating. These binder, solvents and additives and methods for preparing a magnetic coating solution are disclosed, for example, in Japanese Patent Publication No. 26890/1981.

One method for coating a magnetic coating solution is an extrusion coating method. Apparatuses which can be used are disclosed, for example, in Japanese Patent Application No. 159899/1980, Japanese Patent Application (OPI) No. 10912/1983 (the term "OPI" as used herein means an "unexamined published application") and 111476/1983.

The present invention is the most effective when the uppermost layer has a thickness of 2 $\mu$m or less. When the uppermost layer has a thickness of 2 $\mu$m or more, the drying speed is relatively slow and even a conventional method of providing an upper layer on the dried under layer can give a relatively good squareness ratio, where the effect of the present invention is reduced. Furthermore, in order to slow down the drying speed, the relationship between the thickness of the upper layer and that of the under layer is preferably that the thickness of the upper layer is less than or equal to that of the under layer.

One embodiment of the present invention is illustrated in more detail as follows. FIG. 1 shows one embodiment showing a method for preparing a magnetic recording medium of the present invention. A long and belt-shaped non-magnetic support 2 wound from a supply roll 1 continuously travels in the direction of the arrow A and is wound on a take-up roll 7. At the area adjacent to the surface of the non-magnetic support 2 is installed a simultaneous multi-coating apparatus 8. On the surface of the non-magnetic support 2, a magnetic coating solution for an under layer 3 and a magnetic coating solution for an upper layer 4 are simultaneously multi-coated by the multi-coating apparatus 8 to form two undried layers.

In the direction A downstream from the multi-coating apparatus, a magnetic field apparatus 5 for causing magnetic orientation and further a drying apparatus 6 are installed. The magnetic field apparatus 5 may include permanent magnets or solenoids which apply a magnetic field aligned with the direction A. The drying apparatus 6 is conventional. When the non-magnetic support 2 thus provided with two magnetic layers 3 and 4 as described above which are undried passes through the magnetic field apparatus 5, ferromagnetic particles contained in the magnetic layers are magnetically orientated in the travelling direction of the non-magnetic support. By the term undried, it is meant that the magnetic layers show fluid behavior and have not hardened into a solid form. Then, when the support passes through the drying apparatus 6, the undried but aligned magnetic layers 3 and 4 are dried and solidified to obtain a sheet shaped magnetic recording medium consisted of the non-magnetic support 2 provided with two magnetic layers 3 and 4. The thus obtained magnetic recording medium can be cut to a desired shape such as a tape.

The above described magnetic coating solution is a dispersion wherein ferromagnetic particles are dispersed in an aqueous solution of an organic solvent for a binder. Generally ferromagnetic particles in the coating solution for an upper layer have higher coercive force than those in the coating solution for an under layer.

The present invention can be applied in such cases when the above described multiple magnetic layers are provided after coating and drying another single magnetic layer, multiple magnetic layers or a non-magnetic layer on the non-magnetic support and can also be applied when a single magnetic layer, multiple magnetic layers or a non-magnetic layer and the above described multiple magnetic layers are all simultaneously provided.

In the conventional technique, the thickness of the uppermost layer is very thin and the drying speed of a magnetic coating solution is very fast. Moreover, the solvent contained in the magnetic coating solution is adsorbed by the under layer which is already dried, thereby accelerating the rapid increase of viscosity of the magnetic coating solution. Therefore magnetic orientation cannot be done effectively. On the other hand, in the present invention, by a simultaneous multi-coating method, the increase of viscosity of the magnetic coating solution is not accelerated since the undried under magnetic layer 3 does not adsorb the solvent contained in the magnetic coating solution 4 and the desired magnetic orientation can be effectively performed. Furthermore, high frequency characteristics can be increased by adjusting the dried thickness of an uppermost layer to 2 $\mu$m or less. Both the low frequency characteristics and the recording and reproducing efficiencies can also be increased by maintaining the aforementioned thickness relationship, i.e., the thickness of the under layer 3 is equal to or greater than that of the uppermost layer 4.

The present invention will be illustrated in more detail by the following Examples and Comparative Examples.

EXAMPLES 1, 2 AND 3

A polyethylene terephthalate support having a thickness of 14 $\mu$m was simultaneouly coated with magnetic coating solutions for an upper layer and for an under layer having the following formulations by a simultaneous multi-coating method. The under layers were formed to have dry thicknesses of 1 μm, 2 μm and 3 μm. Magnetic particles in the layers were subjected to magnetic orientation by solenoid coils in the travelling direction. Both the layers were dried, and the supports thus provided with magnetic layers were cut to obtain magnetic tapes. The following formulations are based on weights.

| Formulation of a magnetic coating solution for the upper layer: | |
| --- | --- |
| Ferromagnetic alloy particles (Fe—Ni alloy, Ni 2 wt %, $H_c$ 1300 Oe) | 300 parts |
| Polyester polyurethane | 35 parts |
| Copolymer of vinyl chloride, vinyl acetate and maleic anhydride | 30 parts |
| α-alumina | 15 parts |
| Carbon black | 3 parts |
| Butyl acetate | 300 parts |
| Methyl isobutyl ketone | 300 parts |
| Oleic acid | 3 parts |
| Palmitic acid | 3 parts |
| Amyl stearate | 4 parts |
| 75% aqueous solution of ethyl acetate of triisocyanate compound | 22 parts |

| Formulation of a magnetic coating solution for the under layer: | |
| --- | --- |
| Co-containing γ-$Fe_2O_3$ ($H_c$ 620 Oe) | 100 parts |
| Nitrocellulose | 10 parts |
| Polyurethane (Nipporan 2304) | 8 parts |
| Polyisocyanate | 8 parts |
| $Cr_2O_3$ | 2 parts |
| Carbon | 2 parts |
| Stearic acid | 1 part |
| Butyl stearate | 1 part |
| Methyl ethyl ketone | 300 parts |

COMPARATIVE EXAMPLES 1, 2, 3 AND 4

For comparison, a polyethylene terephthalate support having a thickness of 14 μm was coated with a magnetic coating solution for the under layer and was dried to have dry thicknesses of 1 μm and 3 μm. Then on the dried under magnetic layers having dry thicknesses of 1 μm and 3 μm, a magnetic coating solution for an upper layer was coated to prepare upper magnetic layers having dry thicknesses of 1 μm and 3 μm. Magnetic particles contained therein were subjected to magnetic orientation in the travelling direction and dried. The thus obtained non-magnetic support coated with the magnetic layers was cut to prepare a magnetic tape.

Squareness ratios of each sample obtained in the Examples and Comparative Examples were checked, and the results are shown in Table 1.

TABLE 1

| | | Dry thickness μm | | |
| --- | --- | --- | --- | --- |
| | Coating method | upper layer | under layer | Squareness ratio |
| Example 1 | Simultaneous multi-coating | 1 | 1 | 0.871 |
| Example 2 | Simultaneous multi-coating | 1 | 2 | 0.882 |
| Example 3 | Simultaneous multi-coating | 1 | 3 | 0.882 |
| Comparative Example 1 | Two separate coatings | 1 | 1 | 0.832 |
| Comparative Example 2 | Two separate coatings | 1 | 3 | 0.821 |
| Comparative Example 3 | Two seperate coatings | 3 | 3 | 0.869 |

As clear from the above table, magnetic tapes prepared in the examples of the invention exhibit better squareness ratios and better magnetic properties such as sensitivity or S/N ratio than magnetic tapes of the comparative examples having the same thickness with that of tapes prepared in the inventive examples. Among those tapes prepared in the inventive examples, it is understood that the thicker the under layer is, the better the squareness ratio is.

In accordance with the present invention, at least two magnetic layers can be simultaneously provided and magnetic orientation on the magnetic layers is performed while these layers remain undried. The magnetic orientation of ferromagnetic particles contained in the uppermost thin magnetic layer can effectively be conducted. As a result, not only squareness ratios but also sensitivity and S/N ratios can be improved by defining the relationship of the thicknesses, i.e., the thickness of the under layer thickness if equal to or greater than that of the uppermost layer. Thus, a magnetic recording medium having high efficiencies of recording and reproducing and providing highly dense memories can be prepared in accordance with the method of the present invention.

What is claimed is:

1. A method for preparing a magnetic recording medium, comprising the steps of:
    running a support in a first direction;
    simultaneously applying to said running support a first magnetic coating solution and a second magnetic coating solution to thereby form a lower layer and an upper layer on said support;
    perfoming magnetic orientation on said support coated with said lower and upper layers while said lower and upper layers remain undried; and
    drying said lower and upper layers after said magnetic orientation;
    wherein said upper layer has a dried thickness of 2 μm or less and said lower layer has a dried thickness equal to or greater than said dried thickness of said upper layer.

2. A method as recited in claim 1, wherein said magnetic orientation orients magnetic particles in at least said upper layer along said first direction.

3. A method as recited in claim 2, wherein said support is a non-magnetic support.

* * * * *